United States Patent [19]

Naimpally

[11] Patent Number: 5,387,939
[45] Date of Patent: Feb. 7, 1995

[54] ENHANCED RESOLUTION EXTENDED DEFINITION TELEVISION SYSTEM
[75] Inventor: Saiprasad V. Naimpally, Langhorne, Pa.
[73] Assignee: Matsushita Electric Industrial Co., Ltd., Osaka, Japan
[21] Appl. No.: 87,964
[22] Filed: Jul. 6, 1993

Related U.S. Application Data

[63] Continuation of Ser. No. 643,756, Jan. 22, 1991, abandoned.
[51] Int. Cl.[6] .............................................. H04N 7/00
[52] U.S. Cl. .................................. 348/433; 348/434; 348/437; 348/913
[58] Field of Search .................................. 358/11-13, 358/140, 141, 142, 147, 146, 133; H04N 11/00, 7/00, 7/13, 7/08, 7/087, 7/06; 348/432, 433, 434, 435, 436, 438, 913

[56] References Cited

U.S. PATENT DOCUMENTS

| | | | |
|---|---|---|---|
| 4,707,728 | 11/1987 | Hurst | 358/12 |
| 4,884,127 | 11/1989 | Isnardi et al. | 358/142 |
| 4,984,078 | 1/1991 | Skinner | 358/141 |
| 4,985,769 | 1/1991 | Yasumoto et al. | 358/142 |
| 5,075,733 | 12/1991 | Pullen et al. | 358/142 |

FOREIGN PATENT DOCUMENTS

| | | | |
|---|---|---|---|
| 0002468 | 3/1990 | WIPO | H04N 7/000 |
| 9014732 | 11/1990 | WIPO | |

OTHER PUBLICATIONS

An article entitled "MCPIC: A Video Coding Algorithm for Transmission and Storage Applications" by Andria Wong, et al., IEEE Communications Magazine, Nov. 1990.
"Digital and Analog Communications Systems" by L. W. Couch II, MacMillan Publishing Co., Third Edition, 1990, Chapter 5, pp. 331–356.
"Miltidimensional Digital Signal Processing" by E. E. Dudgeion and R. M. Mersereau, Prentice–Hall, Inc., 1984, Chapter 3–titled Design and Implementation of Two-Dimensional Fir Filters, pp. 112–161.
"Digital Communications Systems" by Peyton Peebles, Jr., Prentice–Hall Inc., 1987, Chpaters 3.5 Channel Encoding Fundamentals, pp. 87–101.
"An Extended Definition of Television System Using Quadrature Modulation of the Video Carrier with Inverse Nyquist Filter" by Yoshio Yasumoto, et al., IEEE Transaction on Consumer Electronics, CE 33, No. 3, Aug. 1987, pp. 146–153.
"The Effectiveness and Efficiency of Hybrid Transform/DPCM Interframe Image Coding" by William Pearlman and P. Jakatdar (IEEE, 1984).
"Scene Adaptive Coder" by Wen–Hsiung Chen and William K. Pratt (IEEE, 1984).
"A Wide Screen EDTV" by Kawai, IEEE Transactions on Consumer Electronics, vol. 35, No. 3, 1989, pp. 133–141.
"Experimental Hardware for Proposed Letter Box Wide Aspect EDTV" SMPTE Tech;nical Conference, Oct. 1990, New York City.
"Single Channel HDTV System, Compatible and Non-compatible" by W. F. Schreiber, Second HDTV Workshop in Italy, Mar. 1988.
"Development of MUSE Family Systems," IEEE Transactions on Consumer Electronics, vol. 35, No. 3; Aug. 1989, pp. 153–158, by Y. Kanatsugu, et al.
"A Wide Aspect NTSC Compatible EDTV System" by Minoru Ashibe, et al., SMPTE Technical Conference, Oct. 1990, New York City.
Schreiber, William "6 MHz Single–Channel HDTV Systems" HDTV Symposium Ottawa, Oct. 1987.

*Primary Examiner*—David E. Harvey
*Attorney, Agent, or Firm*—Amster, Rothstein & Ebenstein

[57] ABSTRACT

An NTSC compatible television system capable of enhanced resolution images with an appropriate receiver is described. The video transmission associated with this system may be received by a standard NTSC television receiver and displayed in letter box format. The added information required to achieve enhanced resolution in an 16 by 9 format is bit reduced and transmitted either during the mask areas present when viewing the signal on an NTSC standard receiver and/or in a quadrature channel typically not detectable without a special decoder by the NTSC receiver. The digital information transmitted during the mask areas, the NTSC image, and the digital information transmitted via the quadrature channel are combined to arrive at the enhanced resolution television display.

9 Claims, 5 Drawing Sheets

ENHANCED RESOLUTION EXTENDED DEFINITION TELEVISION SYSTEM

This is a continuation of copending application(s) Ser. No. 07/643,756 filed on Jan. 22, 1991, now abandoned.

BACKGROUND OF THE INVENTION

This invention relates to an Extended Definition Television (EDTV) system that allows transmission of a video signal compatible with existing NTSC television receivers. In particular, the invention relates to an EDTV transmission system which is compatible with the existing NTSC system and in which the signals are transmitted for reception by a standard NTSC television receiver in a letter box format.

The current operating standard for television transmissions in the United States is defined by the National Television Systems Committee (NTSC). This standard was approved for monochrome transmission by the Federal Communications Commission in 1941 and further expanded for NTSC color television systems in 1954. This NTSC standard allocates a 6 megacycle bandwidth for each television channel, i.e. transmission of sequential video images and sound associated with one channel.

Figure 1:
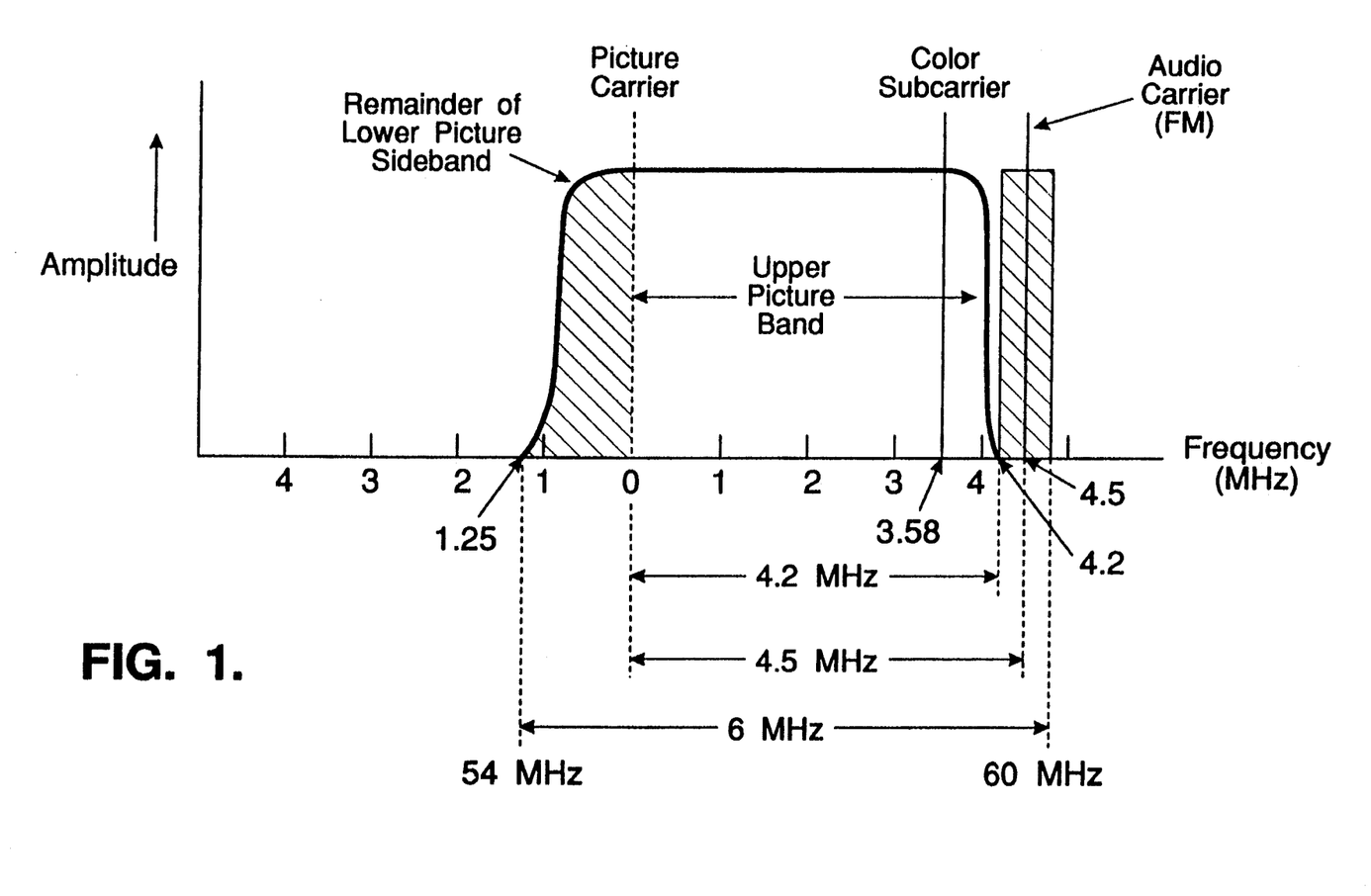
FIG. 1 shows the allocation of the frequency spectrum for the various components of the video channel associated with channel 2, operating between 54 and 60 Mhz in accordance with NTSC standards.

The frequency allocation of a typical television channel broadcasting in the frequency band between 54 and 60 megacycles (i.e. channel 2) using the NTSC standard is illustrated in FIG. 1. As shown, the frequency of the amplitude modulated primary picture carrier is 1.25 megacycles above the lowest frequency of the channel, i.e. 54 megacycles and the color sub-carrier is 3.58 megacycles above the primary picture carrier. The frequency of the frequency modulated (FM) audio carrier is 4.5 megacycles above the primary picture carrier. Given the 6 Mhz bandwidth of the channel, this places the audio (sound) carrier 0.25 megacycle (or 250 KHz) below the high end of the channel, located at 60 Mhz.

The amplitude modulated primary picture carrier is vestigial sideband modulated by the video components. Video signals from 0 up to about 1 MHz are double sideband modulated whereas frequencies higher than about 1 MHz up to the 4.2 MHz limit are single sideband modulated. In fact, all modulation frequencies higher than 1.25 MHz are single sideband, including the audio portion of the signal.

The standard NTSC TV camera-transmitter combination sequentially transmits a stream of two "interlaced" fields forming a single image frame using the frequency spectrum described above. Each of these two fields is made up of sequentially transmitted lines. The aspect ratio of the entire image, defined as the ratio of the height of the image to the width of the image is 3 to 4.

The first field has 262 ½ vertically equispaced lines, and is generated every 1/30th of a second. The second field, displaced in time by 1/60th of a second from the first field, and vertically by a half line, is also transmitted every 1/30th of a second. Of the 262 ½ lines in each field, 240 lines represent the information to be displayed in the actual video image while the balance of the field is used to transmit various types of synchronizing signals. The lines in both fields are representative of the image presented to the camera at the time of transmission of the two fields. Each line contains information detailing the value of intensity of the image over the width of the line, at the corresponding position of the line in the image.

The two fields are referred to as "interlaced" because the first field fits in the voids of the second field. The sequential reproduction of groups of two such interlaced fields reproduced every 1/30th of a second on the screen of an NTSC receiver forms a television image capable of showing the information contained within the transmitted lines making up the individual fields. The NTSC color television system uses a scan rate of 15,734,264 lines per second by the TV camera, as well as the TV receiver, to transmit and display sequences of video images respectively. Therefore, the NTSC system has a vertical resolution corresponding to 240 lines per field.

Newer systems associated with High Definition Television (HDTV) set higher standards of resolution for the transmission of television images. Currently such HDTV television cameras typically generate fields every 1/60th of a second, and have an aspect ratio of 16 to 9, with each field being made up of 525 lines, twice as many as the 262.5 lines per field used by the NTSC standard receivers. This implies a two fold improvement in image vertical resolution as compared with the NTSC system. Furthermore, the horizontal resolution is also at least double that of NTSC.

While HDTV systems deliver a better TV image, the transmission of the HDTV image is incompatible with existing NTSC receivers. Therefore, a problem remains as how to transition to this better quality HDTV system in the face of the large existing installed base of incompatible NTSC receivers. It is clearly desirable to transition from the NTSC system to the HDTV system in a smooth, gradual way where an intermediate standard compatible with both the NTSC and the HDTV system allows use of the existing NTSC receivers while also providing some the benefits of the higher image quality of the HDTV transmissions.

Such a system, designed as an intermediate step to minimize the impact of the transition to HDTV is generally identified as an Extended Definition Television (EDTV) system. Many different EDTV systems capable of transmissions compatible with the NTSC standard as well as preserving some of the advantages of the HDTV image quality have been proposed. These EDTV systems can be generally classified into three major types: a) sidepanel; b) letter box; and c) an intermediate combination of a) and b)

Typically in a sidepanel type EDTV system, the 3 by 4 aspect ratio of the NTSC transmission is preserved and the usual interlaced fields of 240 active lines each are displayed on an NTSC receiver. To create the EDTV image for display on an EDTV receiver, a left and a right sidepanel are added to the standard NTSC image to convert the NTSC 3 by 4 aspect ratio image to the EDTV 9 by 16 aspect ratio image. The sidepanels, comprising video information not displayed by the NTSC receiver, are in essence "added" to the original NTSC image to stretch it to create the 9 by 16 aspect ratio when viewed on an EDTV receiver. Such systems have been discussed in the literature, for example Kawai et al., "A Wide Screen EDTV", IEEE Transactions on Consumer Electronics, Vol. 35, No. 3, August 1989, pg. 133–141.

This type of EDTV system however has some limitations. Since the received sidepanel images entails a different signal to noise ratio as compared to the received NTSC image, the image quality of the sidepanels and the NTSC central portion will be different. When the two side panels and the NTSC portion are combined next to each other on the same screen in the EDTV receiver, the different image quality resulting from the different signal to noise ratios of the three separate parts of the three part image becomes unpleasantly apparent.

Yet another problem associated with the side panel type transmission system is that the information displayed by the sidepanels is lost when viewed on an NTSC receiver. In effect, the NTSC receiver only displays the NTSC portion of the EDTV image, the sidepanel video information being totally lost. This loss of video information can create a variety of difficulties. For example, if a tennis match is viewed, the NTSC portion of the image may show only the net in the center and not the players at the sides.

In contrast, a letter box type EDTV transmission presents an image on a standard NTSC receiver that contains all of the lower frequency information in the full height and width of the originally transmitted image and maintains the original 9 by 16 aspect ratio of the EDTV signal. To fit the 9 by 16 aspect ratio EDTV image into the 3 by 4 ratio of the display of the NTSC receiver requires the introduction of top and bottom mask areas in the EDTV transmitted image reproduced by the NTSC receiver. In the NTSC receiver, these mask areas take the form of an upper and a lower horizontal imageless band above and below the active image area. These two bands restrict the actual video information presented to a subset of the 240 active lines per field used in a typical NTSC system. Due to geometric considerations, displaying a 9 by 16 aspect ratio image on a screen with a 3 by 4 aspect ratio requires that the number of lines used by the NTSC receiver to display the EDTV image be 180. This can be derived by considering that a 9 by 16 aspect ratio image when displayed on a 3 by 4 aspect ratio screen will use exactly 75% of the height of the 3 by 4 screen. Since the full height NTSC image contains 240 active lines, 75% of that is 180 lines. These 180 lines are the most that are available to display the complete 9 by 16 EDTV image on a standard 3 by 4 NTSC receiver.

Prior art letter box systems transmit the information required for the full EDTV image in analog form in the top and bottom mask areas around the image just before and after the transmission of the NTSC compatible portion of the image. This yields a more uniform EDTV image as compared with the side panel system when viewed on a suitable EDTV receiver because the EDTV image is reproduced from video information transmitted through the same part of the transmission channel as the NTSC signal insuring a large degree of signal uniformity. Since a large percentage of overall video information contained in the EDTV image is blended to create the image when reproduced in an EDTV receiver, marked distinctions in signal to noise ratio of the received video signal for various parts of the image are not readily apparent. A typical letter box type system has been described by Norihiro Suzuki et al, in "Experimental Hardware for Proposed Letter Box Wide Aspect EDTV", SMPTE Technical Conference, October 1990, New York City and W. F. Schreiber et al., "Single Channel HDTV System, Compatible and Non-compatible", presented at 2nd HDTV workshop, Italy, March 1988, as well as by Y. Kanatsugu et al., "Development of MUSE Family Systems", IEEE Transactions on Consumer Electronics, Vol. 35, No. 3, August 1989, pp. 153-158.

An EDTV system has also been proposed in which additional information is transmitted in analog form on a quadrature channel to modulate the primary picture carrier in the frequency spectrum limited by the 1.25 Mhz lower channel limit. See, "An Extended Definition Television System using Quadrature Modulation of the Video Carrier with Inverse Nyquist Filter", by Yashio Yasumoto et al, published in the IEEE Transaction on Consumer Electronics, CE-33, Number 3, August 1987, pgs. 146-153. This quadrature modulation cannot be decoded by a standard NTSC receiver and is therefore "invisible" to the NTSC receiver.

These analog EDTV systems transmit and process information in the same general "analog" form as the original NTSC signal. The amount of information that can therefore be transmitted is limited, thereby limiting the quality of the EDTV image when viewed with an EDTV receiver.

Others have proposed various hybrids, or intermediate combinations of the sidepanel and the letter box systems for EDTV systems whose characteristics are meant to achieve various goals through the combination of features from both the letter box and sidepanel types. Such an intermediate system is described by Minoru Ashibe, et al "A Wide aspect NTSC Compatible EDTV System" SMPTE Technical Conference, October 1990, New York City.

In view of the present limitations of EDTV television systems, it is an object of the present invention to provide an EDTV letter box system whose video image has a more uniform appearance as compared to a sidepanel system and has better quality image as compared to existing EDTV letter box systems.

It is yet another object of the present invention to provide an apparatus and method for digitally encoding and transmitting an EDTV signal that can be displayed by an NTSC receiver as well as provide additional enhancing video information for display on the EDTV receiver.

It is a more specific object of the present invention to provide an EDTV letter box system in which the enhanced additional information required in the television image is encoded and transmitted in digital form so as to create improved resolution of the EDTV image.

SUMMARY OF THE INVENTION

This invention is best applied in an EDTV television system where an HDTV video signal having 525 lines per field of video information is generated by the video camera and has a 9 by 16 aspect ratio. The HDTV video signal is converted to the EDTV standard to allow compatibility with NTSC receivers so that the 9 by 16 aspect ratio image may be displayed in its full horizontal extent by the NTSC receiver. In accordance with the invention, information for creating the enhanced image is transmitted in digital format during portions of the television image field not containing the analog information required for the standard NTSC signal. Additional digital information for creating the enhanced image can also be transmitted during the entire active video time on the quadrature phase of the picture carrier.

More specifically, in accordance with the invention, the 480 line HDTV television signal is low pass filtered to a resolution of 180 scan lines and NTSC horizontal bandwidth. After such low pass filtering, the 480 line signal undergoes the following two processing steps:

On the one hand, it is decimated by a factor of ⅔ and converted to a signal with NTSC resolution, i.e. 180 lines are extracted from the original 480 lines.

On the other hand, the low pass filtered 480 line signal is also subtracted from the original HDTV video signal having active, non-band limited scan lines. This difference output constitutes the information representing the enhanced video signal as compared to the standard NTSC video signal.

Preferably this difference output is further processed digitally in a two dimensional filter to produce two separate digital output signals having different information (i.e. bandwidth and/or number of scan line) content. Known digital source coding techniques are applied to both signals to reduce their bit rate by taking advantage of spatial and temporal redundancies in a television field and sequences of fields. One of the digital output signals is then encoded into the quadrature channel associated with the transmission of the television signal. The other digital output signal, is not encoded on the quadrature channel, but is transmitted during those portions of the EDTV signal that constitute the top and bottom mask areas on an NTSC receiver. Alternately, the entire difference output signal may be processed using known digital source coding technique and the quadrature channel may be eliminated.

A switching mechanism is provided to switch at appropriate times between either the 180 line NTSC compatible output or the non-quadrature encoded, bit reduced, digital output signal. This combined signal modulates a conventional NTSC picture carrier. After vestigial sideband filtering, the combined signal is added to the quadrature channel, thus forming the total EDTV signal.

An EDTV receiver performs the inverse steps necessary to decode the digitally encoded information. This receiver has the ability to extract both the digitally encoded information transmitted on the quadrature channel as well as the information transmitted during the times corresponding to the top and bottom mask areas. The EDTV receiver combines the digitally encoded enhancement information with the NTSC image to create the higher resolution EDTV image. A standard NTSC receiver will receive and display the NTSC image in letter box format in response to the EDTV signal transmitted.

DESCRIPTION OF THE DRAWINGS

Features of the invention which are believed to be novel are set forth with particularity in the appended claims. The invention itself however, together with its further objects and advantages thereof, may best be understood by reference to the following description, when taken in conjunction with the accompanying drawings, in which:

FIG. 3 shows the signals present in FIG. 2 and their respective vertical resolution in scan lines per field and bandwidth in megacycles with FIG. 3(a) showing the signal from the HDTV camera and FIG. 3(b) showing the transmitted signal.

FIG. 4 shows the signal sequence in time associated with one field of the EDTV systems of the invention where digital modulation is transmitted in the 30 lines before and 30 lines after the 180 lines associated with the NTSC compatible video signal.

DESCRIPTION OF THE PREFERRED EMBODIMENT

In accordance with the invention, an HDTV signal is converted so it can be received by existing NTSC receivers and can also be received by EDTV receivers which use the enhanced transmitted signal to produce a higher resolution television image as compared to the NTSC receiver and existing EDTV receivers. Since the NTSC receiver does not form any part of the invention and since such receivers can be readily designed by those skilled in the art to receive NTSC television signals transmitted in accordance with this invention, only the EDTV encoder, transmitter and decoder will be described.

A widescreen HDTV compatible, television program is transmitted sequentially using 9 by 16 aspect ratio fields, each field consisting of 525 lines. The fields need not be interlaced. The repetition rate of the fields is 59.94 times per second. Of the 525 lines, 480 are active, i.e. display the actual image while the other lines are used for blanking and other purposes.

Figure 2:
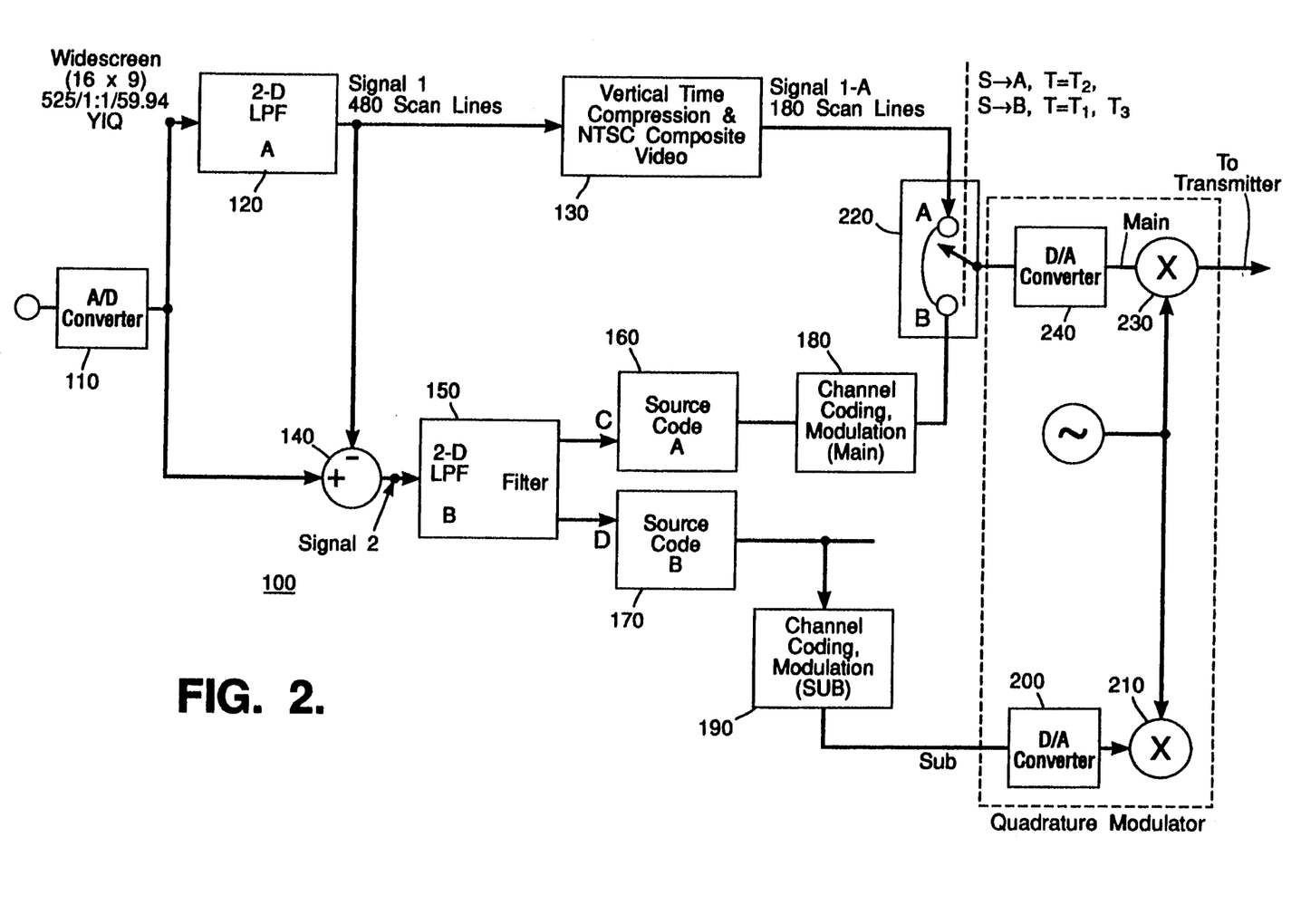
FIG. 2 shows an encoder for the EDTV system of the present inventions.
Figure 3A:
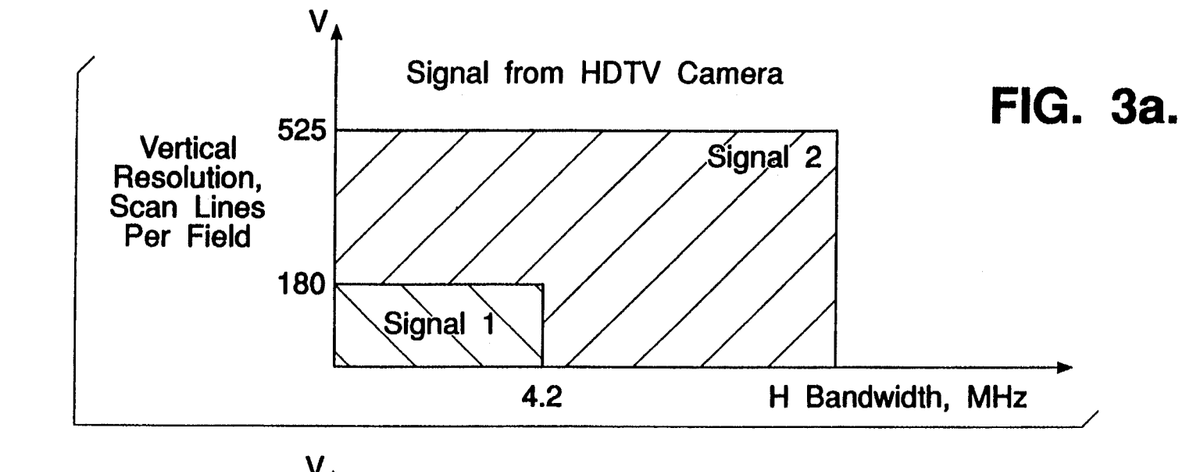

Referencing FIGS. 2 and 3, the HDTV widescreen video signal is digitized by A/D converter 110 part and is then divided into two paths. In the first path, the HDTV signal is applied to a two dimensional low pass filter 120 where the 480 active lines are low-pass filtered to a vertical resolution corresponding to 180 lines and a horizontal resolution equal to that of NTSC. These 480 lines, therefore, correspond to 180 lines of information and contain redundant information. Referring to FIG. 3(a), the signal from the HDTV camera has 525 vertical lines, of which 480 vertical lines represent active information. Further, each line has a horizontal bandwidth content of H Mhz which is wider than the standard NTSC horizontal bandwidth signal content. This 525 line by H Mhz block of information is reduced by the two dimensional filter 120 to Signal 1. Within low pass filter 120, the vertical information present in the 480 active scan lines is reduced to 180 lines of information while the horizontal bandwidth is reduced to 4.2 Mhz, the same bandwidth as the standard NTSC signal. Such low pass filters are well known in the art, and have been described by D. E. Dudgeon and R. M. Mersereau in "Multidimensional Digital Signal Processing", Prentice Hall, Inc. 1984, Chapter 3—"Design and Implementation of Two Dimensional FIR filters", pgs. 112-162.

Signal 1 is applied to a conventional vertical time compression and NTSC composite video circuit 130 where the number of lines is reduced from 480 to 180 without loss of the information contained therein, i.e. one video line is extracted for every 2 and ⅔ lines from Signal 1. The result of this operation is a signal which has 180 scan lines. Since the 180 scan lines are chosen every 2 and ⅔ lines of the 480 scan line HDTV signal geometric shapes and their aspect ratios depicted will be preserved, e.g. circles imaged by the HDTV camera will be shown in this 180 line sample as circles, without distorting them into elipses.

Figure 3B:
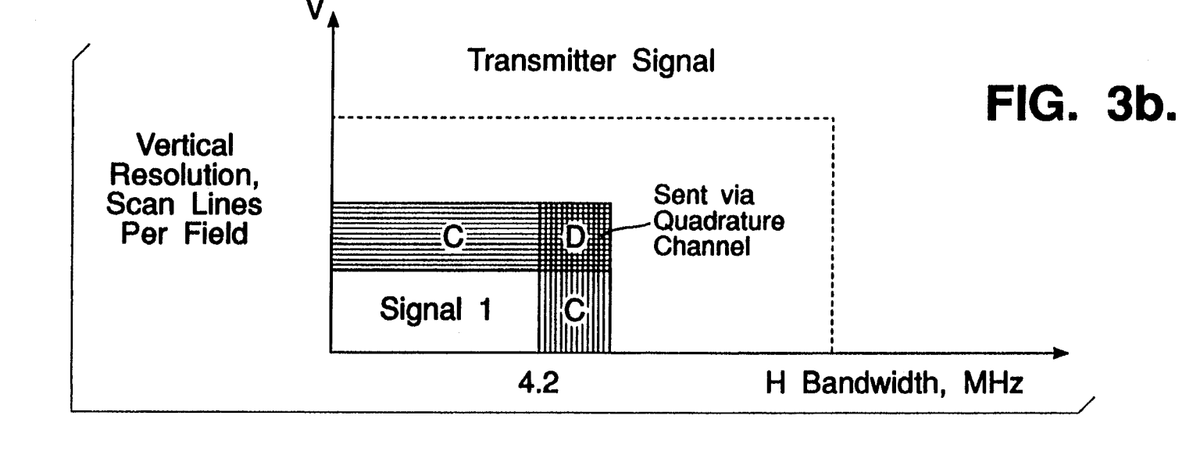

Signal 1 is also applied to subtractor 140 together with the original HDTV signal to produce the difference Signal 2 illustrated in FIG. 3(a). The difference Signal 2 is then applied to a second two dimensional filter 150 where it is divided into signal C and signal D (See, FIG. 3(b)). The combinations of frequencies and lines contained in the signal C output is not present in the signal D output, as shown in FIG. 3(b), i.e. the information contained in the area corresponding to certain line number/frequency combination are allocated to signal C while others are allocated to signal D. Signals C and D are applied respectively to source coding circuits 160 and 170. Source coding circuits 160 and 170 represent a general mechanism for reducing the bit rate typically associated with such transmissions. The source coding used in circuit 160 is typically different than the one used in circuit 170 because the information to be processed is different. The same source coding may be used in both cases if desired. Such source coding techniques are well known and have been detailed, for example, by A. Wong, et al., in "MCPIC: A Video Coding Algorithm for Transmission and Storage Applications", published in the IEEE Communications Magazine, Vo. 28, No. 11, November 1990, pp. 24-32. These techniques are used to eliminate redundant spatial and temporal information from the video image thereby allowing a greater amount of information to be transmitted per unit time resulting in a higher resolution EDTV image.

The output of source coding circuit 160 is applied to a conventional channel coding and modulation circuit 180 which introduces some redundant bits into the signal to increase the reliability of transmission and/or signal to noise ratio and performs digital modulation. Such channel coding and digital modulation techniques are well known and have been discussed by Peyton Peebles, Jr. in "Digital Communication Systems", Prentice-Hall, Inc., 1987, Chapter 3.5—"Channel Encoding Fundamentals", pp. 87–101, and also by L. W. Couch II in "Digital and Analog Communication Systems", MacMillan Publishing Co., 3rd ed. 1990, Chapter 5 pp. 331–356.

The output of source coding circuit 170 is applied to channel coding modulation circuit 190 whose function is to encode the bit reduced signal resulting from source coding 170 for subsequent transmission. The channel coding and modulation can be as previously described for channel coding and modulation circuit 180. The signal generated by channel coding modulation circuit 190 is applied to a digital to analog converter 200 and subsequently in mixer 210 is modulated by a carrier 90° phase shifted with respect to the main video carrier as described by the Yasumoto et. al. article.

A switching mechanism 220 is provided to apply, at times T1, T2 and T3 shown in FIG. 4, either the 180 line NTSC compatible output created in NTSC signal generator 130, or the output of circuit 180 onto the main signal input to digital to analog converter 240 and main channel mixer 230. As illustrated the NTSC signal from NTSC signal generator 130 is applied to digital to analog converter to 240 and subsequently to mixer 230 during time T2 (FIG. 4) only, while bit reduced signal C from channel coding and modulation circuit 180 is applied for the balance of the active time. The output of main channel mixer 230 is filtered by a vestigial sideband filter 250 as required by the NTSC standards and forms one input to combiner 260. Another input to combiner 260 is the output of quadrature modulator 210 after having passed through Inverse Nyquist Filter 270. The purpose of the Inverse Nyquist Filter is to reduce crosstalk between the main and quadrature (or sub) channels as described in the Yasumoto et. al. article. The output of combiner 260 forms the EDTV IF signal which is transmitted after RF conversion. The transmitted EDTV signal thus consists of the following:

1. On the main or non-quadrature, phase of the picture carrier, during times T1 and T3:
   Bit reduced signal C after appropriate channel coding and digital modulation
during time T2:
   180 scan lines of NTSC signal
2. On the quadrature phase of the picture carrier, during times T1, T2 and T3, the bit reduced signal D after appropriate channel coding and digital modulation.

Figure 5:
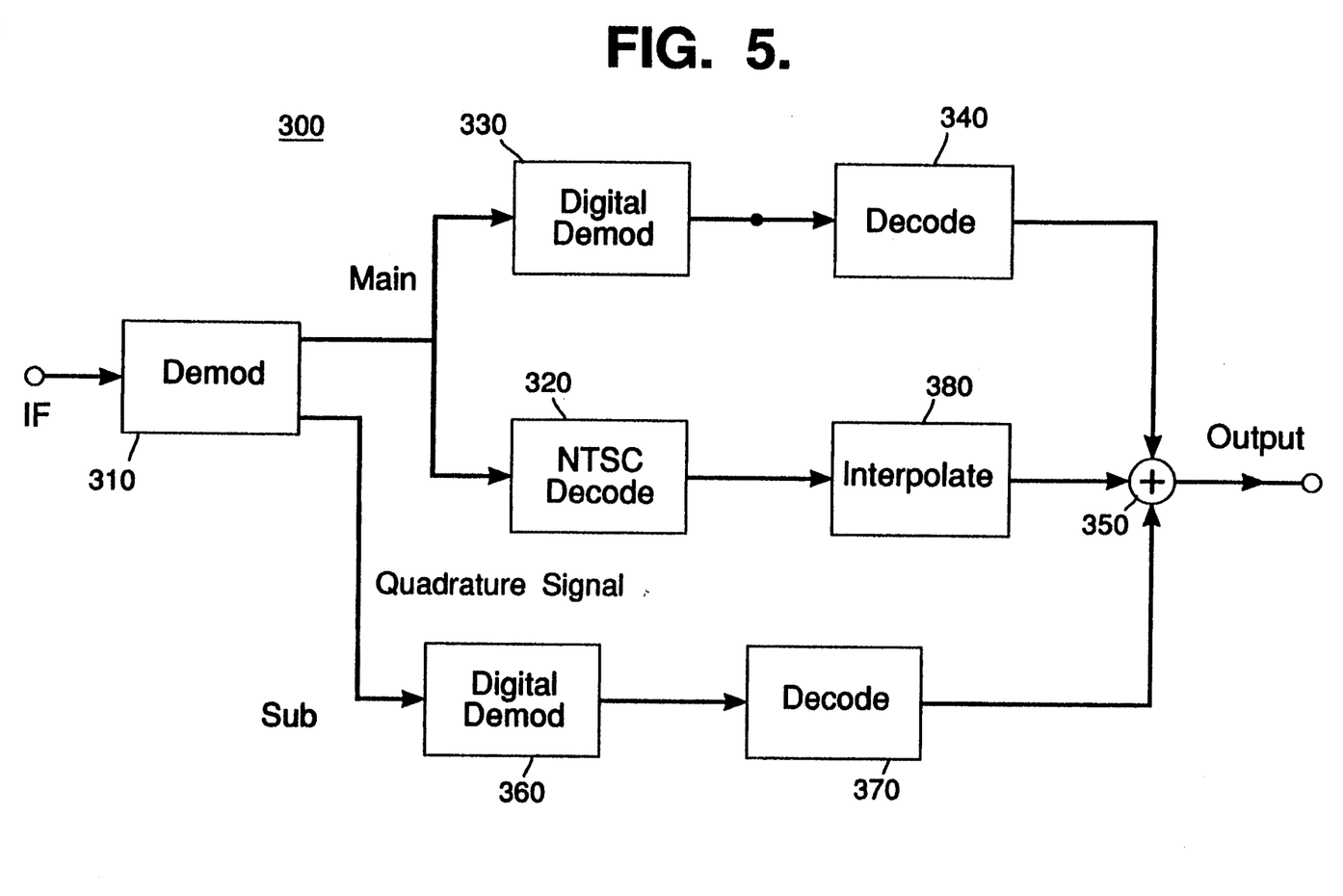
FIG. 5 shows a block diagram of a decoder for the EDTV system of the present invention.

FIG. 5 is a block diagram of the EDTV decoder 300 required to detect and decode the EDTV signal encoded and transmitted in accordance with the present invention. Essentially, the receiver performs the inverse of the operations performed by the transmitter to generate the scanning information which creates the EDTV image on the screen.

After the customary amplification of the received radio frequency signal, (not shown), the intermediate frequency (IF) signal containing the video information is extracted via known means. The next step to be performed in the receiver on the IF signal is its demodulation by quadrature demodulator 310 into a main (in phase) and quadrature signal. The first output is the signal encoded on the quadrature channel. The second output is the non-quadrature or main signal associated with the normal NTSC video signal, that is typically decoded by the NTSC receiver and which contains the letterbox format of 180 lines of NTSC video and 60 lines of digitally modulated enhancement information per field.

Having extracted the quadrature and non-quadrature signal, digital demodulation and source decoding is to be performed on the quadrature signal by digital demodulator 360. The quadrature signal contains the elements of Signal D previously encoded by source coding circuit 170 and channel coding and modulation circuit 190. The inverse operations required to extract the encoded information are well known and described in the references describing source coding circuit 170 and channel coding modulation circuit 190.

The non-quadrature channel, or main channel, has the NTSC compatible signal during time T2 and digitally encoded information from source coding circuit 160 and channel coding modulation circuit 180 during times T1 and T3. A conventional NTSC decoder 320 extracts the NTSC image information during time T2, while digital demodulator 330 extracts the digital information transmitted during times T1 and T3. Decoder 340 performs source coding on the information from digital demodulator 330 for subsequent incorporation into the final image by combiner 350. Similarly, for the quadrature channel, after digital demodulator 360 extracts the digital information by performing the inverse function of channel coding modulator circuit 190 in the transmitter, decoder 370 performs source coding, following which the signal is incorporated into the final image. Also, interpolator 380 upconverts the NTSC information to 480 lines for application to combiner 350. Combiner 350 combines the image information from decoders 340 and 370 with the image information from interpolator 380 to reconstitute the information contained in the originally transmitted EDTV image. In an NTSC receiver the NTSC portion of the transmitted signal would be received and displayed in letter box format.

Many other modifications, additions, and or subtractions from the illustrated embodiments may be made without departing from the spirit or scope of the invention, which is indicated by the appended claims and equivalents thereto.

I claim:

1. In a television transmitter where an HDTV video field having 525 lines having low frequency components and high frequency components is transmitted representative of an image having a 9 by 16 aspect ratio, said HDTV video field-being converted to allow compatibility with NTSC receivers so that said low frequency components of said 9 by 16 aspect ratio image are displayed in their entirety by said NTSC receiver, a video image encoding apparatus for encoding an enhanced video image comprising:

means for providing a first output signal representative of a number of scan lines of information having a known relation to the number of active scan lines of video information in the HDTV field;

means responsive to said first output signal for selecting and bandlimiting a predetermined number of scan lines to produce an NTSC compatible output signal;

means for subtracting said first output signal from said HDTV signal to produce a third output signal;

means responsive to said third output signal for producing at least a fourth output signal containing bit rate reduced video information in digital format for producing an enhanced video image;

switching means receiving said NTSC compatible output signal and said fourth output signal for producing a fifth output signal coupled to a television transmitter containing said NTSC compatible signal during a first selected time period and said fourth output signal during a second select time period.

2. A television transmitter as described in claim 1 wherein said means for providing a first output signal representative of a number of scan lines of information having a known relation to the number of active scan lines is a two dimensional low pass filter.

3. A television transmitter as described in claim 1 wherein said means responsive to third output signal separates said third output signal into a sixth and a seventh output signal, said sixth output signal is transmitted to said switching means while said seventh output signal is transmitted to a quadrature encoding means for inclusion into said fifth output signal coupled to said television transmitter.

4. A television transmitter as described in claim 3 wherein said sixth output signal is processed with a source coding means to reduce the number of digital bits representing video information contained in said sixth output signal prior to transmission to said switching means.

5. A television transmitter as described in claim 4 wherein said sixth output signal is also processed in a channel coding means to improve said sixth output signal tolerance to external interference.

6. A television transmitter as described in claim 3 wherein said seventh output signal is processed in a source coding means to reduce the number of digital bits representing video information contained in said seventh output signal prior to transmission to said quadrature encoding means.

7. A television transmitter as described in claim 6 wherein said seventh output signal is also processed in a channel coding means to improve said seventh output tolerance to external interference.

8. In a transmitter where an HDTV video field having 525 lines having high and low frequency components is transmitted representative of an image having a 9 by 16 aspect ratio, said HDTV video field being converted to allow compatibility with NTSC receivers so that said low frequency components of said 9 by 16 aspect ratio image are displayed in their entirety by said NTSC receiver, a method for providing an enhanced video image comprising:

providing a first output signal representative of a number of scan lines of information having a known relation to the number of active scan lines of video information in the HDTV field;

selecting and bandlimiting a predetermined number of scan lines to produce as a second output an NTSC compatible output signal;

subtracting said first output signal from said HDTV signal to produce a third output signal;

encoding and compressing said third output signal into a fourth output signal, said fourth output signal comprising bit rate reduced video enhancement information in digital format for producing an enhanced video image; and transmitting said NTSC compatible output signal during a first selected time period and said fourth output signal during a second selected time period.

9. The method of claim 8 wherein said encoding and compressing comprises generating the fourth and a fifth output signal comprising digital video enhancement signals of bit rate reduced video enhancement information and further comprising the step of transmitting said fifth output signal during the duration of both said first and said second selected time periods.

* * * * *